United States Patent Office 3,387,832
Patented June 11, 1968

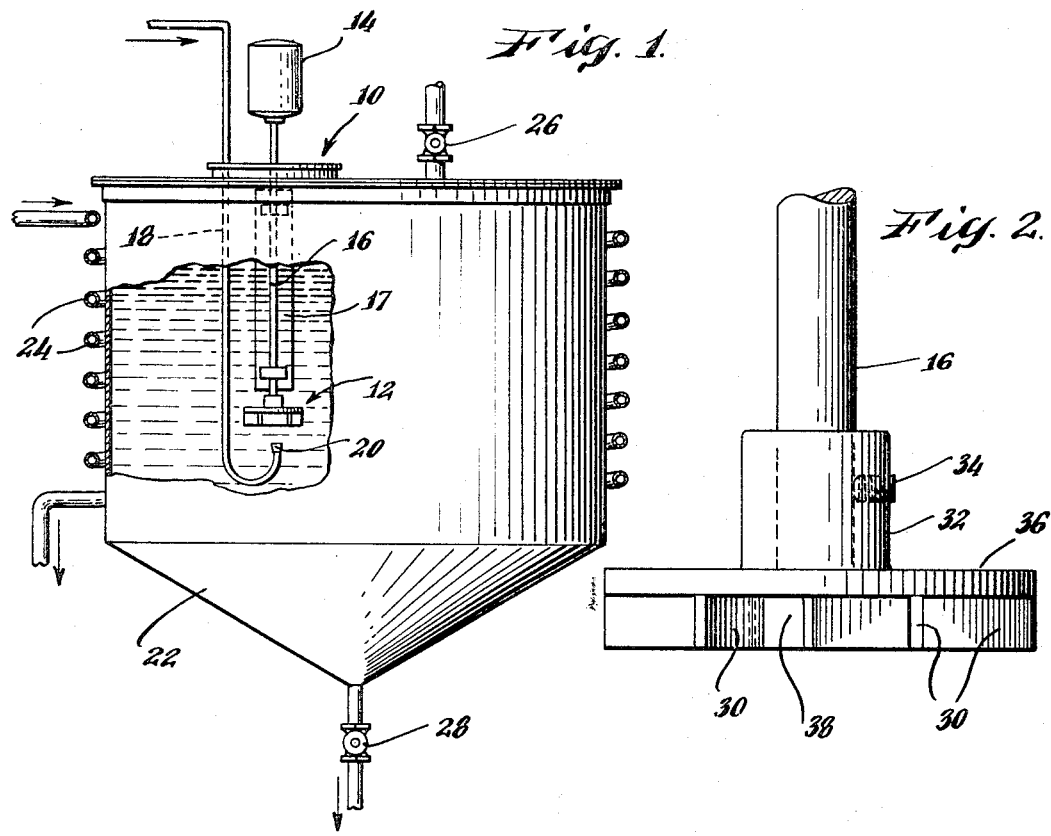
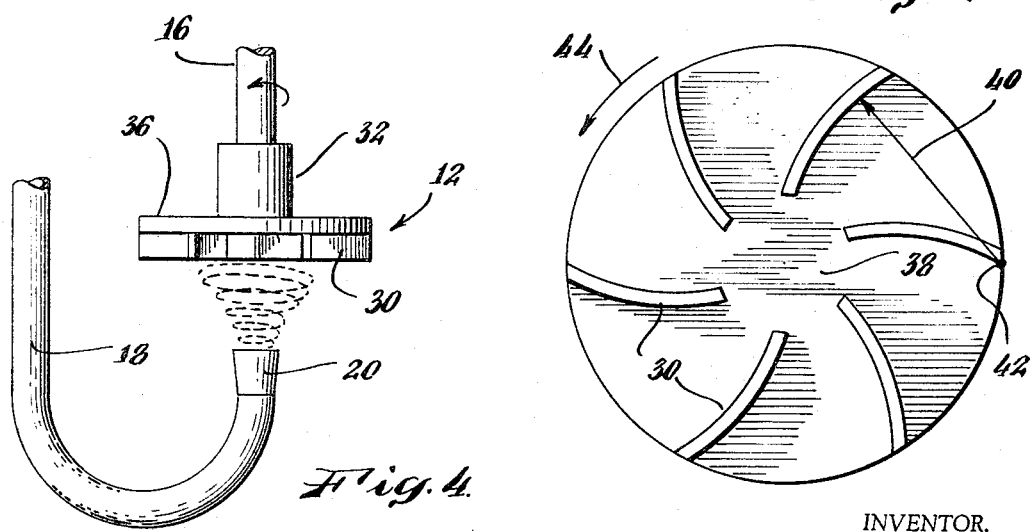

3,387,832
APPARATUS FOR DISPERSING A
GAS IN A LIQUID
Earl W. Nelson, Lynchburg, Va., assignor to American
Cyanamid Company, Stamford, Conn., a corporation of
Maine
Filed May 2, 1967, Ser. No. 635,613
4 Claims. (Cl. 261—93)

ABSTRACT OF THE DISCLOSURE

The apparatus comprises a rotary impeller submerged in a liquid in which a gas is to be dispersed. The impeller has a horizontal top plate and a plurality of curved vanes extending along the underside of the top plate from adjacent its center to its periphery. A J-shaped tube extends into the liquid and introduces the gas from an upwardly facing exit end at a point spaced directly below the center of the impeller. Rotation of the impeller breaks the gas into finely divided bubbles for dispersion in the liquid.

Background and objects of the invention

In the processing, purifying, and other reacting of liquids, it is often necessary to disperse and mix a liquid with a gas. An example of dispersion and mixing of a gas with a liquid is in the purification of titanium tetrachloride ($TiCl_4$). Crude titanium tetrachloride contains several impurities, among these vanadium which must be removed before the titanium tetrachloride is oxidized to titanium dioxide ($TiO_2$). Accordingly, hydrogen sulfide ($H_2S$) gas is mixed with crude $TiCl_4$ to precipitate vanadium which is then separated from the $TiCl_4$ by settling and/or distillation. The purified $TiCl_4$ is then oxidized to $TiO_2$.

The prior art approach in the dispersion and mixing of a gas in a liquid has been generally to use porous plates, or the like, having a number of small gas exit orifices through which the gas is bubbled into the liquid. Such prior art gas dispersion apparatus, when used in the purification of crude $TiCl_4$, were readily plugged by precipitates and necessitated frequent cleaning. Because of the location of the porous plates in the $TiCl_4$ tank, the cleaning operation was time consuming and expensive. Further, to provide an acceptable rate of dispersion of $H_2S$ in the $TiCl_4$ required an inordinately large porous plate.

I have found that the dispersion of a gas such as $H_2S$ in a liquid such as $TiCl_4$ can be effectively and efficiently accomplished by the use of a rotary impeller having a shrouded top with the gas fed to the center of the rotating impeller to be broken up into small bubbles for efficient reaction with and dispersion into the liquid.

Accordingly, an object of this invention is to provide apparatus for dispersion of a gas in a liquid.

Another object of the invention is to provide apparatus of the above character wherein the dispersion of the gas is effected by a rotary impeller immersed in the liquid.

A further object of the invention is to provide apparatus of the above character wherein said impeller operates to break up relatively large gas bubbles into finely divided bubbles and disperse and mix the bubbles into the surrounding liquid.

Another object of the invention is to provide apparatus of the above character which is relatively economical in manufacture and efficient in operation.

The invention accordingly comprises the features of construction, combination of elements, and arrangement of parts which will be exemplified in the construction hereinafter set forth, and the scope of the invention will be indicated in the claims.

For a better understanding of the nature and objects of the invention, reference should be had to the following detailed description taken in connection with the accompanying drawing, in which:

FIGURE 1 is a schematic side view, partially broken away, of a liquid treatment tank employing the gas dispersion apparatus of my invention;

FIGURE 2 is a partial side view of the impeller of the gas dispersion apparatus of FIGURE 1;

FIGURE 3 is a bottom view of the impeller shown in FIGURE 2; and

FIGURE 4 is a partial enlarged view of the impeller and the gas supply tube shown in FIGURE 1.

Detailed description of the preferred embodiment

Referring now to FIGURES 1 and 4, the gas dispersion apparatus 10 constructed according to my invention includes an impeller 12 immersed in the liquid and driven by a motor 14 through a drive shaft 16 suitably journalled on a support 17. The gas, supplied preferably through a J-shaped tube 18 having its exit end 20 positioned below the impeller center, is introduced to the impeller 12 in relatively large bubbles for dispersion into the liquid.

While a J-shaped tube is preferred, tubes of other configurations with their exit ends situated below the impeller center may be employed.

The whole apparatus 10 is supported on a tank 22, which in the case of $TiCl_4$ purification is surrounded by heat exchange pipes 24 and has valved entry and exit connections 26, 28 respectively, for $TiCl_4$.

In operation, the $H_2S$ treatment of $TiCl_4$ is accomplished in a batching operation with tank 22 being filled with crude $TiCl_4$. The $H_2S$ gas is then fed through tube 18 and bubbles upwardly toward the center of the impeller 12. The rotating impeller breaks up the large gas bubbles into very finely divided bubbles and, at the same time vigorously impels and mixes the gas into the surrounding $TiCl_4$ liquid. In addition, the impeller 12 acts as a liquid agitator.

Additional agitation means possibly driven off shaft 16 may be used, provided that the flow of gas bubbles into the impeller center is not disturbed.

Because of these finely divided bubbles, the surface area of the $H_2S$ gas available for reaction with the impurities in the $TiCl_4$ liquid is drastically increased. Consequently, the purification process can be performed rapidly and efficiently.

I have further found that it is desirable to mount gas supply tube 18 in such a manner that it may be readily removed for cleaning. In this connection, by locating the exit end 20 of the tube 18 below the vortex formed by the impeller, as shown in FIGURE 4, plugging of the exit end is reduced. I have also found that outwardly flaring the tube end 20 dampens pressure fluctuations in the tube and reduces the tendency of solid precipitates to become lodged therein. The J-shaped configuration of the gas supply tube 18 permits it to be introduced into the liquid from above while properly positioning its upwardly facing exit end 20 relative to the impeller 12. The gradual curve of its lower portion facilitates the removal of precipitates lodged therein, such as by reaming.

The impeller 12, as seen in FIGURE 2, includes a hub 32 which is affixed on the lower end of drive shaft 16 by any suitable means such as a set screw 34. A horizontal shroud or top plate 36, having a circular configuration, is affixed to the lower end of hub 32. A plurality of vanes 30 (FIGURES 2 and 3), affixed to the under side of top plate 36, extend outwardly from the open central portion 38 to the periphery of the top plate; this open central portion providing greater access for liquid-gas flow into the impeller center.

I have discovered that more efficient gas dispersion is achieved when each of the vanes 30 is provided with an arcuate configuration. Moreover, I have found that optimum performance is achieved when the vanes are formed having a radius of curvature, indicated at 40 in FIGURE 3, substantially equal to the radius of top plate 36. The location of the center, indicated at 42 in FIGURE 3, of this radius of curvature 40 is preferably substantially at the point where the next adjacent vane 30 terminates at the periphery of top plate 36. The impeller is rotated in the direction indicated by arrow 44 in FIGURE 3 preferably at a peripheral speed of from 300 to 400 inches per second.

In an actual working embodiment of a gas dispersion apparatus constructed in accordance with the invention the impeller 12 has a diameter of 4 inches, and each vane 30 is formed having a thickness of ⅛ inch, a height of ½ inch, and a radius of curvature of 2 inches. The impeller is rotated at a rate of 1750 revolutions per minute.

While the present invention has been described in connection with the dispersion of a gas in a liquid, it will be appreciated that the disclosed apparatus would also be applicable to the dispersion of a liquid in another liquid of greater density. One or more additional impellers driven from the same shaft may be provided; each impeller having its own gas supply tube.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also understood that the following claims are intended to cover all of the generic and specific features of the invention which, as a matter of language, might be said to fall therebetween.

Having described my invention, what I claim as new and desire to secure by Letters Patent is:

1. Apparatus for dispersing hydrogen sulfide gas in crude titanium tetrachloride liquid, comprising in combination:

(A) a vessel containing said titanium tetrachloride;

(B) a rotatably mounted impeller immersed in said titanium tetrachloride, said impeller comprising (1) a substantially horizontal, imperforate top plate, and (2) a plurality of vanes extending generally radially along the under side of said top plate from adjacent its center to its periphery, (a) each said vane having a curved configuration and terminating at said top plate periphery in a trailing configuration relative to the direction of impeller rotation, (b) the radius of curvature of each said vane being substantially equal to the radius of said top plate with the center of the radius of curvature for each said vane located at the point where each next adjacent vane meets said top plate periphery;

(C) means for rotatably driving said impeller; and (D) a gas conduit for said hydrogen sulfide having means forming a gas exit terminating below and spaced from the center of said impeller.

2. Apparatus as defined in claim 1 wherein said gas conduit is a J-shaped tube extending downwardly into said tank and curved on a single radius adjacent its gas exit end to direct said hydrogen sulfide forced therethrough upwardly into said impeller center.

3. Apparatus as defined in claim 2 wherein said gas exit end is flared and located below the vortex produced by said impeller when rotated in said titanium tetrachloride.

4. The apparatus defined in claim 3 wherein said means rotatably driving said impeller is a motor rotating said impeller at a peripheral speed of from 300 to 400 inches per second.

References Cited

UNITED STATES PATENTS

| | | | |
|---|---|---|---|
| 1,526,596 | 2/1925 | Greenwalt | 261—93 |
| 2,448,590 | 9/1948 | Gunther | 261—87 |
| 2,530,814 | 11/1950 | Becze et al. | 261—93 |
| 2,542,031 | 2/1951 | Humfeld et al. | 261—93 X |
| 2,628,827 | 2/1953 | Daman | 261—93 X |
| 2,678,912 | 5/1954 | Kalinske et al. | 261—93 |
| 2,750,328 | 6/1956 | Stimpson | 261—93 X |
| 3,271,304 | 9/1966 | Valdespino et al. | 261—121 X |

HARRY B. THORNTON, *Primary Examiner.*

TIM R. MILES, *Examiner.*